United States Patent [19]

Bappert et al.

[11] Patent Number: 4,675,972
[45] Date of Patent: Jun. 30, 1987

[54] METHOD OF FIXING AN INSULATING MATERIAL PLATE TO BE PLASTERED TO A STRUCTURAL SURFACE

[75] Inventors: Adolf Bappert, Kappel, Switzerland; Hans P. Bader, Bonndorf-Gündelwangen, Fed. Rep. of Germany

[73] Assignee: Faster GmbH & Co KG, Stettenhofen, Fed. Rep. of Germany

[21] Appl. No.: 841,218

[22] Filed: Mar. 19, 1986

Related U.S. Application Data

[62] Division of Ser. No. 465,353, Feb. 9, 1983, abandoned.

[30] Foreign Application Priority Data

Feb. 12, 1982 [CH] Switzerland .......................... 900/82
Feb. 12, 1982 [CH] Switzerland .......................... 901/82

[51] Int. Cl.⁴ .............................................. B23P 19/00
[52] U.S. Cl. .................................... 29/526 R; 29/460; 156/92
[58] Field of Search ........................... 29/526 R, 460; 156/92 R; 144/353

[56] References Cited

U.S. PATENT DOCUMENTS

| | | | |
|---|---|---|---|
| 2,663,662 | 12/1953 | Graf et al. | 144/353 |
| 3,587,198 | 6/1971 | Hensel | 29/460 |
| 4,361,953 | 12/1982 | Peachee | 29/526 R |
| 4,452,023 | 6/1984 | Stahlberg | 52/378 |
| 4,562,635 | 1/1986 | Carter | 29/460 |

*Primary Examiner*—W. D. Bray
*Attorney, Agent, or Firm*—Roylance, Abrams, Berdo & Goodman

[57] ABSTRACT

An insulating material plate (4) is fixed to the surface (6) of a structure (8) by a dowel (2) with a disk-like head (14), countersunk in a countersunk hole (24) of plate (4) and carrying on its outer surface an insulating material washer (10). Washer (10) prevents the thin plaster layer (22) from separating at the location of dowel head (14), due to the thermal expansions and differing thermal conduction between the dowel material and the mortar material. The insulating material washer (10), which is e.g. made from the same material as the insulating plate, also makes it possible to level the outer surface (20) of the insulating material plate by abrasion, prior to the application of the mortar layer, so that a smaller thickness of the latter can be used.

4 Claims, 12 Drawing Figures

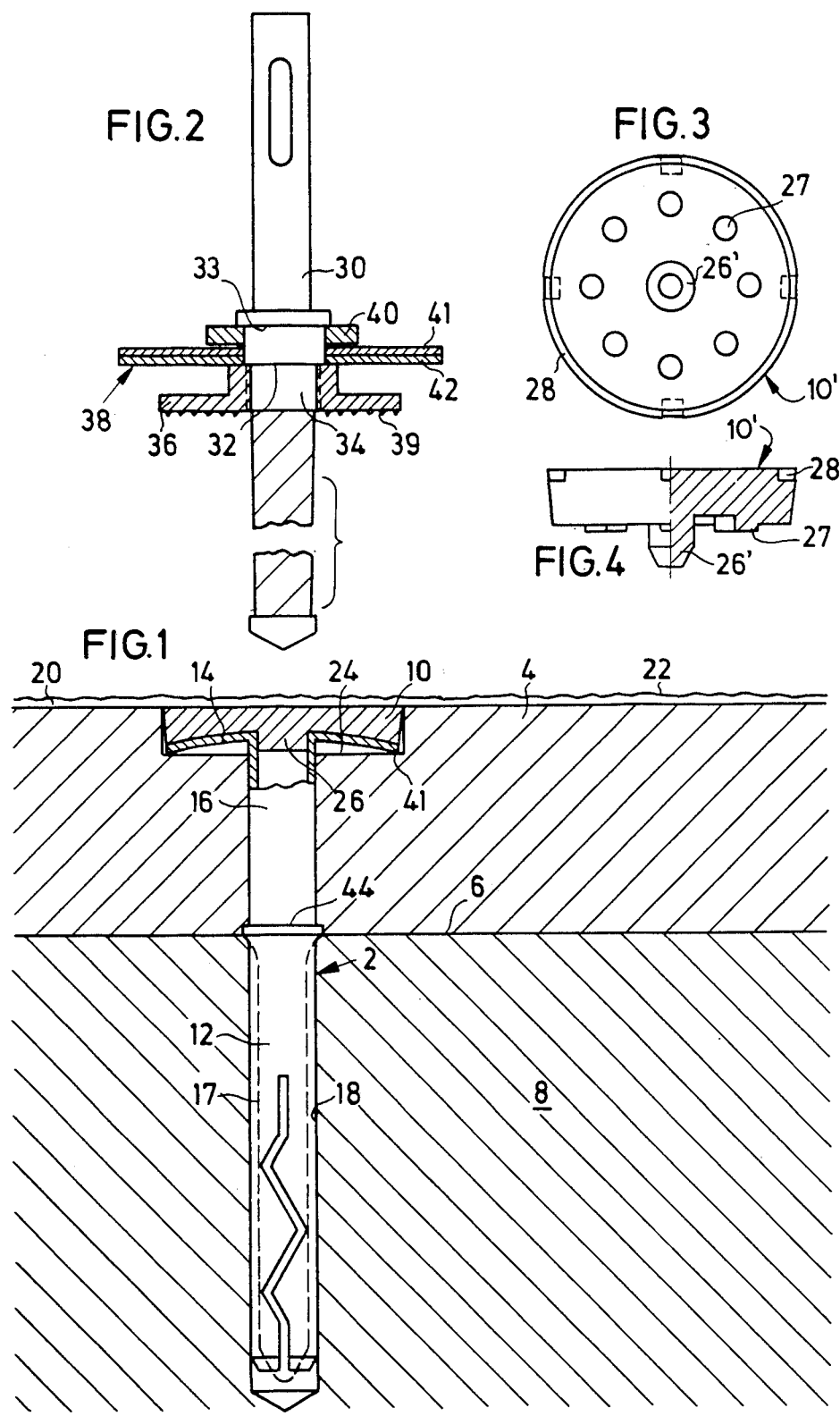

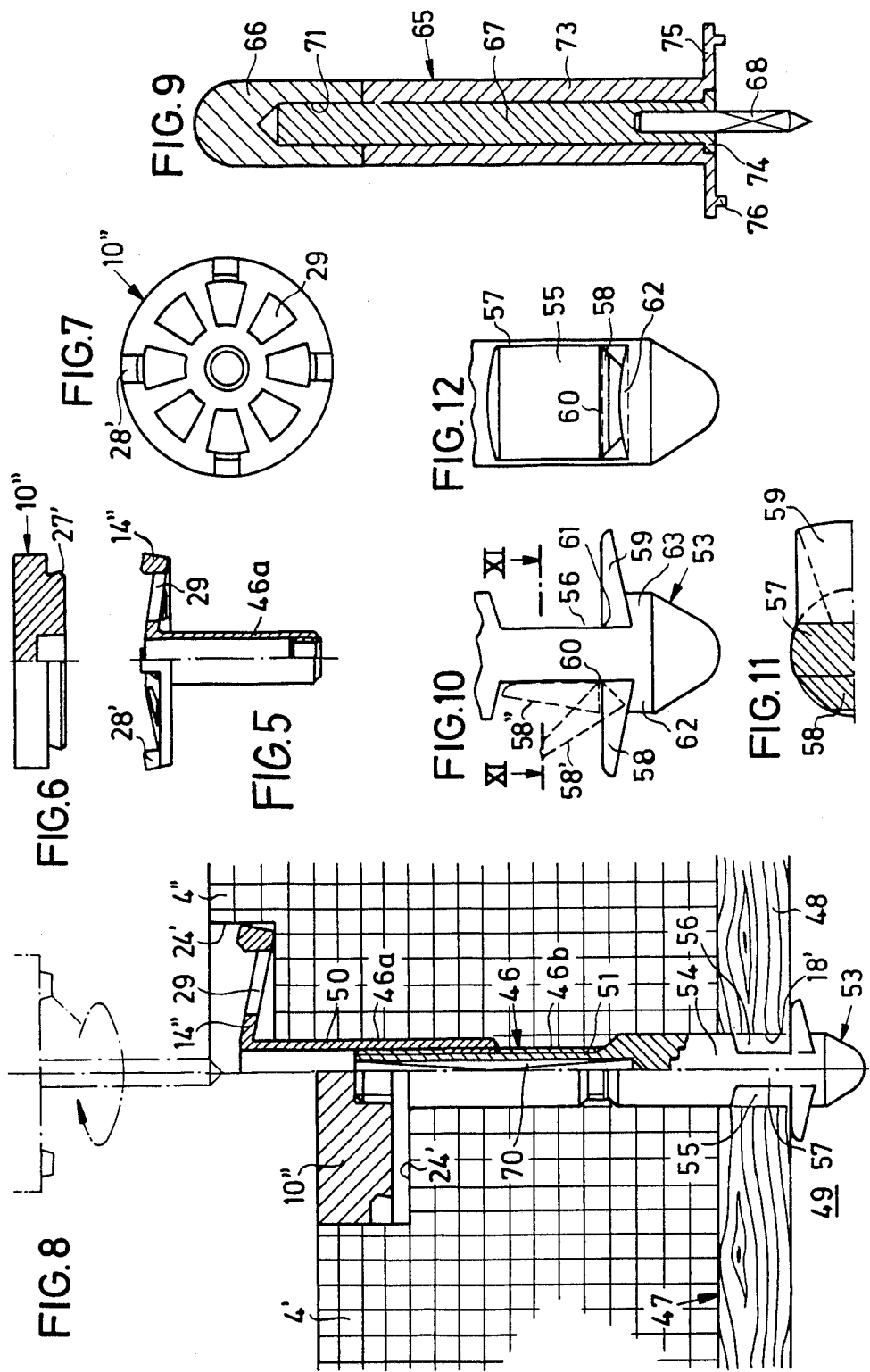

METHOD OF FIXING AN INSULATING MATERIAL PLATE TO BE PLASTERED TO A STRUCTURAL SURFACE

This is a division of application Ser. No. 465,353 filed Feb. 9, 1983, now abandoned.

The invention relates to a method for fixing an insulating material plate to be plastered to a structural surface, whereby after arranging the insulating material plates on the structural surface, at least one location hole for a dowel is drilled through it into the structural surface and a dowel provided with a disk-like head is subsequently inserted into the drill hole, so that its head presses against the insulating material plate.

The dowel conventionally used for performing this method is made from a plastics material and has a mushroom-shaped, nail-like dowel part and a straddling dowel part mounted on its shaft end and it is driven by gentle hammer blows into the prepared holes, until its disk-like head presses firmly against the insulating plate surface. A suitable dowel is, for example, known from German Utility Model No. 7,932,608. The insulating material plate can also additionally be fixed to the structural surface by an adhesive layer. However, the latter is inadequate to prevent the separation of the insulating material plate after a certain time.

In order to protect the insulating material plate or the numerous insulating material plates fitted in juxtaposed manner to a structure from the influence of the weather and also for esthetic reasons, the outer surface is subsequently blasted with a thin mortar layer. Thus, this mortar covers the joints between the insulating material plates and also the heads of the fixing dowels. The mortar layer thickness is approximately 2 to 3 mm and must not exceed a certain amount, because otherwise vapour locks are formed. However, it has proved to be disadvantageous that the points at which the dowels are fitted after some time become apparent on the surface in the form of cracks and colour changes. The reason for this is the different material characteristics of the dowel material and the mortar, with respect to thermal conductivity and thermal expansion coefficients. This disadvantage cannot be prevented by the thicker application of the mortar because, as stated hereinbefore, the thickness of the latter must not exceed a certain value.

The problem of the present invention is to obviate the aforementioned disadvantage by a method of the previously indicated type, which is simple, time-saving and therefore cost-saving to perform. According to the invention, this problem is solved in that in the same operation with the drilling of the location hole, a countersunk hole having the diameter of the dowel head is cut into the insulating material plate and the countersunk hole is filled by an insulating material washer engaging on the dowel head.

As a result of the method according to the invention, the plaster spacing e.g. the distance between the mortar layer and the disk-like dowel head part is increased by the thickness of the insulating material washer, so that a disadvantageous influencing of the mortar layer is prevented. The insulating material washer is preferably made from the same material as the insulating material plate. It is also advantageous to level the wall surface before applying the mortar layer by abrading the surface of the fixed insulating material plates without being impeded by the dowel heads, so that the levelling of the wall surface is not brought about by the mortar layer and consequently in a material-saving manner, a thinner mortar layer can be used.

To avoid the filling of the countersunk hole with the insulating material washer in an additional operation on site, the method is advantageously performed by using a dowel. The dowel has disk-like head made from the dowel material and an insulating material washer fixed on the disk-like head in the factory. The disk-like dowel head and the insulating material washer can be joined in various different ways, such as e.g. by adhesion or pressing shaped-on projections on one part into correspondingly shaped recesses on the other part.

The production of the countersunk hole in the same operation with the drilling of the dowel hole into the structural surface takes place in a simple and time-saving manner by means of a drill with a mounted cutting part and a rotatably mounted stop member fixed to the drill shaft. The rotary stop member makes it possible to drill without any particular effort or expenditure for checking the drilling depth, because said stop member obviates damage to the insulating material plate surface. The stop member can be fixed during drilling or it stops immediately on contact with the easily damagable insulating material plate surface.

Thus, the invention also comprises a dowel combined with an insulating material washer for performing the method.

The invention is described hereinafter relative to the drawings, wherein show:

FIG. 1 a cross-section through an insulating material plate fixed to a wall through the dowel axis.

FIG. 2 an axial section of the tool for producing the dowel location hole.

FIG. 3 a view of the bottom of an insulating material washer.

FIG. 4 a bisected side view of the insulating material washer of FIG 3.

FIG. 5 an angular axial section through the dowel head area of another embodiment of an insulating plate dowel.

FIG. 6 a bisected side view of an insulating material washer for the dowel head of FIG. 5.

FIG. 7 a plan view of the dowel head of FIG. 5.

FIG. 8 a partial cross-section through an insulated wall in the vicinity of a dowel for matching to insulating plates of different thicknesses, the dowel being bisected, each half having a different matching position, with a diagrammatic partial representation of a tool for adjusting the dowel length.

FIG. 9 a cross-sectional view of a tool for adjusting the length of the dowel of FIG. 8.

FIG. 10 a larger-scale side view in the vicinity of the tip of the dowel of FIG. 8.

FIG. 11 a cross-section through the dowel along line XI—XI of FIG. 10.

FIG. 12 a side view of the dowel part shown in FIG. 10.

FIG. 1 shows dowel 2 in the fitted state, in which it fixes an insulating plate 4 formed e.g. from Styropor, mineral fibres or the like, to the surface 6 of a structure 8 to be insulated. Fixing between insulating material plate 4 and structural surface 6 can additionally take place by an adhesive layer, so that dowel 2 only provides additional security against detachment from the adhesive layer.

In the represented embodiments, dowel 2, in addition to insulating material washer 10, comprises a dowel shank formed by a straddling dowel 12 and a nail-like dowel pin 16. Dowel pin 16 has a disk-like head 14, and is driven into straddling dowel 12. In FIG. 1, pin part 17 of dowel pin 16, located in straddling dowel 12, is illustrated with broken or phantom lines. On pin part 17 dreferably not shown peripheral grooves are provided, which improve the anchoring in the straddling dowel 12. However, dowel 2 can also be constructed in one piece, so that its shank is anchored on driving into the wall of the dowel location hole 18 provided in structure 8.

In the case of known dowels for the same use the disk-like or mushroom-shaped dowel head 14 engaged on the outer face 20 of the insulating material plate 4, or was pressed somewhat into its surface due to the elastic deformability of the insulating plate material. The dowel head was provided with interruptions or holes to bring about an adhesion of the mortar layer 22 to be applied at the location of the outer dowel head surface. However, following the initial formation of cracks, this could not prevent the separation of the mortar layer in the vicinity of the dowel head. The insulating material washer 10 provided on dowel head 14 in accordance with the invention, prevents this influence due to the different material characteristics between the dowel material and the mortar material at this limited fixing point of the insulating material plate. The thickness of the washer also makes it possible to level the insulating material plate surface 20 by abrasion, prior to the application of mortar layer 22 and offers sufficient material for this. The countersunk arrangement of the dowel head 14 naturally presupposes the prior aformation of a correspondingly deep countersunk hole 24.

Insulating material washer 10 is preferably completed with the dowel in the factory. The production of the connection between the insulating material washer 10 and the disk-like dowel head 14 can take place by the pushbutton-like pressing in of one or more extensions 26 into a correspondingly shaped recess of the dowel head, with or without the use of an adhesive. Washer 10 can also be shaped onto the dowel head during manufacture in the mould, so that the still fluid material of the washer penetrates into depressions of the dowel head prior to hardening and anchores itself there.

FIGS. 3, 4 and 6, 7 show examples of insulating material washers 10', 10" having a plurality of short studs 26', 27 and/or 27' on their bottom. The disk-like dowel head 14" has in corresponding shape, arrangement and size, holes 29, into which can be pressed studs 26', 27, 27' so that they are fixed under pretension. On the upper peripheral edge of insulating material washer 10', 10", there are several smaller recesses 28, 28' into which can penetrate the plaster mortar 20, so that there is an even further improvement in the bond with the mortar layer at the transition point between the edge of countersunk hole 24, 24' and the insulating material washer. The insulating material washer according to FIGS. 3, 4 and 6, 7 can take place separately and alone in a mould or can take place in a mould in which the dowel 2 is inserted, so that shaping takes place in the mould.

FIG. 2 shows a tool for producing the dowel location hole 18, 18', as well as countersunk holes 24, 24' in a single operation. The tool has a through shank 30, whose upper end is held in a drill chuck in the usual way. Shank 30 is shaped in much time the same way as in known rock drills, but it has stepped stop shoulders 32, 33 and a threaded part 34. The first stop shoulder 32 is used for fixing the position of cutting head 36 for producing the countersunk hole 24, in that the cutting head is screwed onto threaded part 34 up to the said stop shoulder 32. Correspondingly thick, not shown shims can be arranged between stop shoulder 32 and cutting head 36 for varying the position of head 36 relative to the drill shank 30. The axial length of threaded part 34 can be made greater for a larger adjustment range.

The second stop shoulder 33 is used for positioning relative to shank 30, a disk-like stop member 38 arranged so as to rotate about said shank and which limits the drilling depth. The distance between the working surface 39 of cutting head 36 and the said stop member 38 determines the depth of countersunk hole 24. For modifying the drilling depth, it is possible to provide between the stop shoulder 33 and the rotatably mounted stop member 38, correspondingly thick shims 40.

The rotary stop 38 comprises, for example, two circular disks 41, 42 having a low mutual frictional resistance due to a suitable choice of material. Due to the frictional forces, stop member 38 initially also rotates, but on contact with the surface 20 of insulating material plate 4 immediately stops, so that there is no damage thereto. This leads to a simple operation of the drill, because it can be advanced without checking until the stop member 38 prevents further drilling.

After retracting the drill, it is possible to insert in the thus produced stepped hole 18, 24 the particular insulating plate either by pressing in with an appropriate force or by the use of a hammer with a striking surface at least corresponding to the size of the insulating material washer. The collar 44 of the straddling dowel, whose diameter is somewhat larger than that of the hole 18, is in no way prejudicial, because the insulating plate material has a relatively large elasticity. However, collar 44 abuts against surface 6 of structure 8, so that on driving in the insulating plate dowel, the movement of straddling dowel 12 stops, whilst the dowel pin 16 slides further into the straddling dowel until the dowel head strikes the bottom of countersunk hole 24. In the represented embodiment, engagement takes place along the head edge 41, because the disk-shaped dowel head 14 is slightly convex.

The insulating plate dowel 46 shown in two different fitting positions in FIG. 8 is constructed for fixing insulating plates 4', 4" to walls 47 having a cavity 49 behind a wall limiting plate 48, so that there must be engagement behind the latter for an adequate fixing of dowel 46. As in this case, dowel 46 in adaptation to the different thicknesses of insulating plates 4', 4" cannot penetrate correspondingly deeply into the location hole 18 of a structure 8, as in the embodiment of FIG. 1, dowel 46 according to FIG. 8 can undergo a length change, in that a dowel part 46a with a disk-like dowel head 14" and having a hollow shank 50 can be screwed into the remaining dowel parts 45b or its hollow shank 51 used for anchoring to wall 47.

The dowel end 54 facing dowel tip 53 has a solid construction connected onto the hollow shank 51 and a central, cross-sectionally rectangular web part 57 formed by two diametrically facing recesses 55, 56 and onto which is shaped in hinge-like manner and on either side, a barb part 58, 59, in the manner shown in FIG. 10. The hinge joint 60, 61 between the web part 57 and the pivotable barb part 58 or 59 resulting from the elastic deformability of the plastics material of the dowel is shaped from the end of recess 55 or 56 in accordance with the base width of the barb part, so that the barb parts 58, 59 abut in the completely spread-apart position on shoulders 62, 63 at the end of the recesses. This position corresponds to that in the finally mounted state of the dowel corresponding to FIG. 8 and is shown by a continuous line in FIG. 10. Two other positions of the barb parts are shown by broken line 58', 58" in FIG. 10. Position 58' corresponds to the inital position of barb part 58 or the position after the manufacture of the dowels by injection moulding. After inserting the dowel unit, i.e. insulating plate dowel 46 comprising the parts 46a, 46b in the prepared location hole, due to the contact with the wall of the hole, the barb parts 58, 59 flap inwards in position 58" and then after passing through location hole 18' in cavity 49 behind limiting plate 48 spread apart again into position 58' due to the material elasticity in the hinge joint. Dowel part 36a is then rotated with respect to dowel part 46b, so that as a result of the threaded engagement between them, the distance between dowel tip and dowel head 14" is reduced and the barb parts are reversed in the position of FIG. 8 until engagement takes place with shoulders 62, 63.

The width of barb parts 58, 59 approximately corresponds to the dowel diameter, as can best be gathered from FIG. 11. Their thickness approximately corresponds to the spacing between hinge joints 60, 61 and shoulders 62, 63, which approximately corresponds to the depth of recesses 55, 56. FIG. 8 shows that shearing forces and no bending forces occur on barb parts 58, 59 due to the tension on the dowel during the tightening thereof, so that said dowel can absorb a correspondingly high clamping force.

The clamping force of the dowel, with which it presses the insulating material plate 4', 4" against a limiting plate 48 of a structure, is produced by turning dowel part 46a relative to dowel part 46b by means of a tool, indicated diagrammatically in the upper part of FIG. 8 by means of dot-dash lines. FIG. 9 shows an embodiment of such a clamping tool 65, which is manually operated. Clamping tool 65 has a shank-like central part 67 fixed by means of a handle 66 and to whose end remote from the latter is anchored in nonrotary manner a square bolt 68, which engages in the cross-sectionally identically shaped inner area 70 of hollow shank 51 of dowel part 46b when using the clamping tool. Handle 66 has an axial bore 71 surrounding one end of the shank-like central part 67 in tight fitting manner. Between handle 66 and the end of clamping tool 65 carrying the square bolt 68 is provided a rotary sleeve 73, which is held axially and with limited clearance at the end of central part 67 by a collar 74. The rotary mounting of the rotary sleeve takes place in contact with the cross-sectionally circular central part 67. At its end remote from handle 66, rotary sleeve 73 passes into a radially directed locking disk 75, which has at least one extension 76 for engagement in dowel head 14".

After mounting clamping tool 65 on the headside dowel end in such a way that the square bolt 58 engages in the hollow shank 51 of the dowel and extension 76 of locking disk 75 engages e.g. in depression 29 of dowel head 14", the screwed-down dowel part 46a can be screwed relative to dowel part 46b by manually further rotating rotary sleeve 73.

It is obvious that the manually operated clamping tool 65 can be replaced by a corresponding motor-driven clamping tool.

What is claimed is:

1. A method for attaching a plate of insulating material to a support structure, comprising the steps of:
    positioning the plate against the support structure;
    forming a hole through the plate and into the support structure;
    forming in the plate a countersink of predetermined diameter and depth concentric with the hole;
    inserting into the hole and countersink a dowel with a dowel shank and a disk-shaped head having a diameter approximating that of the countersink, such that the dowel shank is positioned in the hole and the disk shaped head is recessed in the countersink and presses the plate against the support structure; and
    filing the countersink hole with a washer of insulating material engaging the disk shaped head of the dowel.

2. A method according to claim 1 wherein the hole and countersink are formed by a tool having a drilling shank, a countersink cutting head attached to the drilling shank and spaced from the tip thereof, and a rotatably mounted stop member spaced from the tip of the shank behind the countersink cutting head and abutting the stop member against the plate limiting the depth of countersink formed by the coountersink cutting head.

3. A method according to claim 1 and including the steps of abrading an outer surface of the insulating material washer to level that surface with the plate surrounding the countersink, and coating the washer and plate with a layer of plaster.

4. A method according to claim 1 wherein the head member and washer are fixedly attached to the dowel before insertion of the dowel into the hole.

* * * * *